United States Patent

[11] 3,623,142

| [72] | Inventor | Mayes O. Key<br>Locust Grove, Okla. |
|---|---|---|
| [21] | Appl. No. | 864,669 |
| [22] | Filed | Oct. 8, 1969 |
| [45] | Patented | Nov. 23, 1971 |
| [73] | Assignee | Bruce E. Johnson<br>Tulsa, Okla.<br>a part interest |

[54] CABLE CONDUCTOR LOCATOR INCLUDING CAM-OPERATED SWITCH MEANS FOR IMPRESSING A PULSING CURRENT ON THE CONDUCTOR
2 Claims, 3 Drawing Figs.

| [52] | U.S. Cl. | 324/66,<br>324/52 |
|---|---|---|
| [51] | Int. Cl. | G01␣ 19/16,<br>G01␣ 31/08 |
| [50] | Field of Search | 324/52, 66;<br>307/132 |

[56] References Cited
UNITED STATES PATENTS

| 1,358,901 | 11/1920 | Varley | 307/132 X |
| 2,144,847 | 1/1939 | Miller | 307/132 |
| 2,315,374 | 3/1943 | Hutchens | 307/132 |
| 2,789,268 | 4/1957 | Bechtel et al. | 324/66 |
| 2,993,167 | 7/1961 | Smith | 307/132 X |
| 3,076,931 | 2/1963 | Jasper | 324/66 |

OTHER REFERENCES

Locating Underground Cable Faults, Electrical World, Dec. 26, 1925, Vol. 86, No. 26, pp. 1297– 1300, copy in 324– 52

*Primary Examiner*—Gerard R. Strecker
*Attorney*—Robert E. Massa

ABSTRACT: A method of locating a particular electrical conductor among a plurality of electrical conductors from a remote location comprises applying a pulsing current to each of said conductors in turn, and identifying the particular electrical conductor by measuring the pulsing current with a clamp-on ammeter. If certain of the electrical conductors are "live," the ammeter will identify them by their steady current, and if other of the conductors show no current flowing, the operator knows that they are not the ones sought. The pulsing current is applied to the conductor by means of an apparatus having a synchronous motor operating against a cam member which in turn operates a make and break switch to impress a pulsing current of known amplitude to the conductor, which is subsequently identified by a clamp-on ammeter.

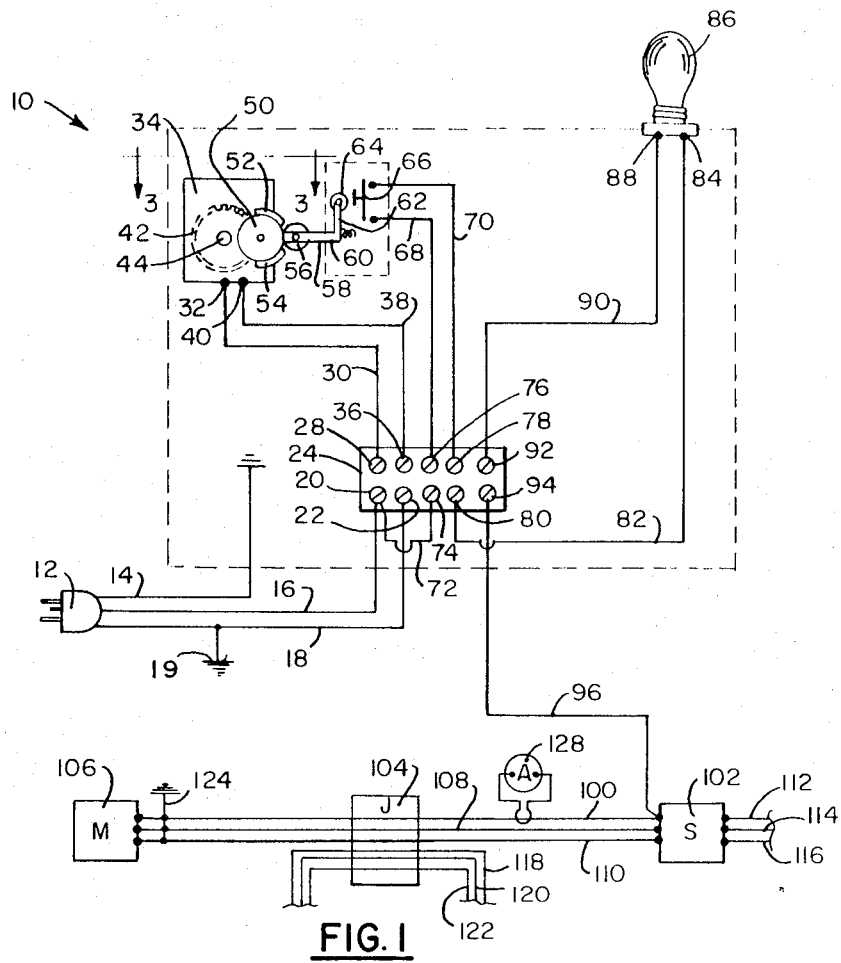
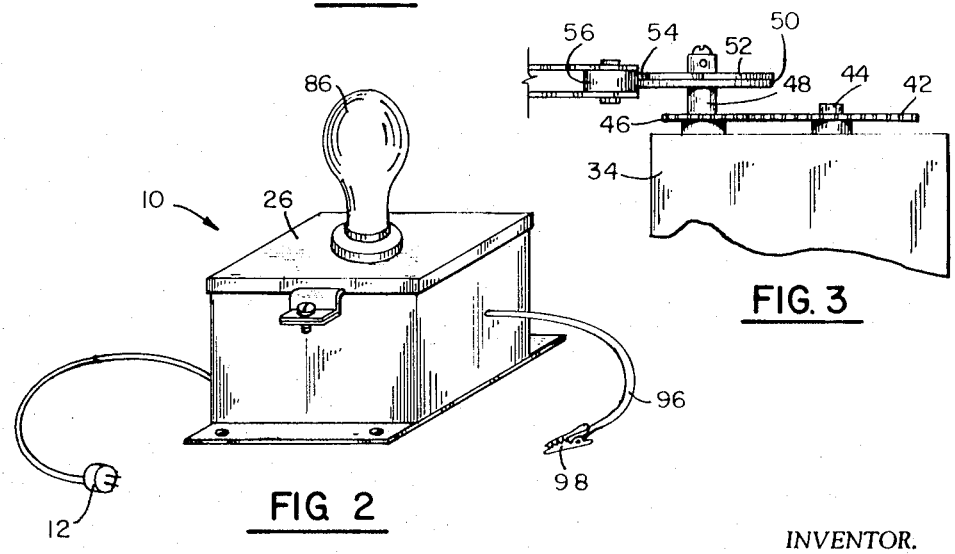
INVENTOR.
MAYES O. KEY
BY
Robert C. Mason
ATTORNEY

CABLE CONDUCTOR LOCATOR INCLUDING CAM-OPERATED SWITCH MEANS FOR IMPRESSING A PULSING CURRENT ON THE CONDUCTOR

BACKGROUND OF THE INVENTION

This invention relates to a method and apparatus for locating and identifying electrical conductors. More particularly, this invention relates to a method and apparatus for locating a particular electrical conductor among a plurality of conductors from a remote position.

It is present day practice to combine in a single conduit many electrical conductors through a considerable length of the conduit. Usually, as in a large industrial plant, certain additional conductors enter the conduit along its length, or certain conductors exit from the conduit at certain points. Oftentimes, as many as 100 or more electrical conductors are present in a length of conduit at the same time, and because of the similarity in physical characteristics of each electrical conductor, an efficient system for identifying particular conductors is needed. Sometimes this conduit and its enclosed conductors are quite long, and may range in length from one hundred feet to one half a mile or longer. Thus, locating a particular conductor at a certain exit, as at a junction box or "pull box," along the length of conduit, is a difficult task, and can be quite time consuming. Usually at least two persons are required to test each conductor in turn in attempting to locate and identify a particular conductor. In this type of operation, one person stations himself at a first end of the group of conductors and a second person stations himself at a second end of the group of conductors, which may be at a junction box or at a point where certain of the conductors have become grounded. Then, various means are employed to identify the conductors. Two methods of identifying the conductors are described in U.S. Pat. Nos. 1,158,086 to Vahey, issued Oct. 26, 1915, and 1,900,424 to Woodbury, issued Mar. 7, 1933.

I distinguish my invention from that of Vahey primarily in that I do not require the multiplicity of detection devices for a multiwire system as described in his patent. My method requires only a single device for identifying the conductor upon which a characteristic current has been impressed, and only a single device for impressing that current.

Also, I can distinguish my method and apparatus from that of Woodbury for similar reasons, in that his test equipment includes a multiplicity of devices for impressing the characteristic frequencies upon the conductors which I am able to avoid resulting in a great savings in material costs, size of equipment, weight of the apparatus, and ultimate selling price.

My invention does not limit the user to the identification of just a small number of wires by reason of the limitation of equipment size, number of identifying components, or because of the difficulty of distinguishing frequencies impressed upon the conductors. In some of the devices heretofore used, there is a practical limitation because in some uses a separate identifying component must be employed for each conductor. Also, where the testing device relies upon the identification of a particular frequency in association with each conductor, only a limited number of frequencies can be employed at one time and properly identified.

I have provided a particular safety feature in my method and apparatus in that the operator does not probe a "hot" wire. In connecting the apparatus to one wire, or a series of wires, to be examined for identification, the operator first assures himself that those wires are disconnected from their usual source of power before he connects my device with the conductor. Then, the only amperage applied to the conductor is the amperage supplied by the testing device of this invention itself.

The primary object of this invention is to provide a method and apparatus for easily and quickly identifying a particular electrical conductor.

Another object of this invention is to provide a method and apparatus for identifying a particular conductor which will be safe in practice, and convenient and efficient to use.

Still another object of this invention is to provide an apparatus for identifying a particular electrical conductor which is compact, simple to use, inexpensive, and easy to manufacture.

BRIEF DESCRIPTION OF THE DRAWINGS

Further objects and advantages of the invention will become apparent from the following description and claims and from the accompanying drawings wherein:

FIG. 1 is a view partly top elevational and partly schematic showing a device according to this invention incorporated in a system for identifying particular electrical conductors.

FIG. 2 is a perspective view of a component according to this invention useful in impressing an identifiable current upon an electrical conductor.

FIG. 3 is a fragmentary side elevational view along the lines 3—3 of FIG. 1.

DESCRIPTION OF THE PREFERRED EMBODIMENTS

A method of locating a particular electrical conductor among a plurality of electrical conductors, according to this invention, comprises locating a first end of the plurality of electrical conductors, grounding a second end of the electrical conductors, wherein the particular conductor sought to be identified is included in the grounded conductors, applying a pulsing current through a load to the electrical conductors in turn, and identifying the particular conductor by measuring the pulsing current.

The above-mentioned method of this invention is carried out by a locator device which comprises a stand, an electric motor mounted on the stand and connected to a source of power, a cam member driven by the electric motor, a series circuit including said source of power, a load, a test lead; and a switch member to open and close the circuit in response to rotative movement of the cam member.

In the usual practice, the particular conductor being sought is quite long and generally at various places along its entire length, becomes associated with numerous other conductors in passing through a common conduit. A certain reason may exist for wanting to locate the particular cable, for example, somewhere along its length a splice may be desired, or at some point the particular conductor may have become grounded and there is a need to replace a portion of it, or there may be a need to locate the particular cable in order to include other equipment in its length. The cable locator device described in detail hereinafter is particularly useful in accomplishing these purposes. With a first end known of the electrical conductor to be located and identified, the current in that cable is turned off if it has not already been discontinued by reason of a short circuit. The operator connects a test lead from the cable locator device to a suitable point at the first end, and plugs the cable locator device into a suitable source of power. The operation of the cable locator device then causes a pulsing current to flow through the electrical conductor and a clamp-on ammeter is employed to identify the electrical conductor through which this pulsing current is flowing.

My method and apparatus include a particular safety feature because the operator does not probe a "hot" wire. In fact, in employing a clamp-on ammeter, the operator does not have to probe any wire. In some methods and devices, the operator must insert a probe into the conductor in order to carry out the operation. Consequently, the operator is exposed to danger is he should happen to probe the wrong wire and come into contact with a wire carrying considerable current.

Referring now to the drawings in detail, FIG. 1 describes a cable locator device 10, generally, according to this invention showing one method of operation of the device in locating a particular electrical conductor. In FIG. 1, the device is shown partly schematically, and in FIG. 2 the device is shown in one embodiment as it is arranged in a portable apparatus. A suitable electrical plug 12 is placed in a conventional source of power and is connected to an equipment ground wire 14, a first electrical lead 16, and a second electrical lead 18 which has a ground connection 19. Leads 16 and 18 are connected respectively to binding posts 20 and 22 positioned on plate member 24 which is secured internally of a suitable box member 26 which in turn contains the circuit components and operating members of the locating device. Binding post 20 is in contact with binding post 28 to which a further lead 30 is connected to lead to a suitable connection 32 of motor 24. Binding post 22 is in contact with binding post 36 to which is connected lead 38 which is further connected to a second motor connection 40 to complete the motor circuit.

A gearwheel 42 is secured to motor shaft 44 and meshes with gear 46 secured to shaft 48. Shaft 48 has positioned thereon a wheel member 50 and a pair of adjustable cam members 52 and 54 which are adjustable circumferentially around wheel 50 in order to provide periodic contact with roller 56 held on arm 58 which is pivotable on pin 60. Arm 62 is connected to arm 58 and includes another roller member 64 which then makes periodic contact with make and break switch 66. At one portion of its cycle switch 66 provides connection between leads 68 and 70 which thus provides the pulsing current for the particular electrical conductor desired to be identified. Lead 72 connects binding post 20 and binding post 74. Binding post 74 is in contact with binding post 76 so that a circuit is completed between lead 16 and lead 68. Lead 70 is connected to binding post 78 which is in further contact with binding post 80 to which lead 82 is connected which is further connected to one contact 84 of a circuit for load member 86 which preferably is a 300 watt bulb. Another contact 88 of the circuit for load 86 is in connection with lead 90 connected to binding post 92 which is in further connection with binding post 94 to which test lead 96 is connected. For convenience in performing the testing operation, a conventional alligator clip 98 is attached to lead 96 so that a portion of the particular electrical conductor to be identified may be quickly and conveniently included in the identifying circuit.

Then, shown schematically in FIG. 1 is one manner in which the identifying operation may be carried out. Test lead 96 is suitably connected to a first end of a particular electrical conductor to be identified 100, which in this instance is located at a terminal within a motor starter 102. In this figure conductor 100 is shown to pass through a conventional pull box or junction box 104 on its route to motor 106. For purposes of this example, it is assumed that conductor 100 is the conductor which it is desired to identify for some particular purpose, and that conductor 100 is one member of the electrical circuit operating motor 106 along with conductors 108 and 110 which are also connected to motor starter 102 as one portion of a main circuit. Conductors 112, 114, and 116 are shown entering motor starter 102 from a suitable main circuit.

It is also assumed for purposes of this example that a distance of perhaps 100 to 300 feet exist between motor starter 102 and motor 106, and that a plurality of other unrelated conductors 118, 120, and 122 also pass through junction box 104 in close confinement with conductor 100. As mentioned above, it is conceivable that as many as 100 conductors might pass through this same junction box making it a difficult task to identify one particular one.

To initiate the identification procedure, motor starter 102 is turned off and conductors 100, 108, and 110 are properly grounded, either to a good ground or which might occur in the event of a defect in the conductors, or cause to be in a grounded condition by reason of contact with a surrounding conduit or other conductor. Thus, a circuit is completed between ground connections 124 and 19. Then, with the apparatus in this arrangement, the cable locator device is turned on and the proper pulsing current flows through conductor 96 and conductor 100. A clamp-on ammeter 128 is positioned around various conductors in turn until the ammeter registers the particular pulsing current which passes through the conductor, in this case conductor 100, at the previously known amperage and cycling pulse. The operator then is assured that he has located the particular conductor being sought.

The operator is assured of his identification because the various conductors passing through junction box 104 will register three distinct conditions when tested with clamp-on ammeter 128. As already mentioned, the particular conductor being sought will carry the pulsing current of known amperage and cycle. Those conductors which are "hot" but which carry no load, will indicate no amperage when tested. Those conductors which are in a separate circuit and which are carrying a load will indicate an unfluctuating amperage.

In most applications, the point at which the cable locator device and test lead are connected to the circuit as at motor starter 102, will be at a remote position in regard to motor 106, and may be at a great distance, or at considerable difference in level above or below ground. Thus, in use of this device, it is extremely convenient to include the device in the circuit at a convenient point and to perform the testing with the clamp-on ammeter wherever the conductors may be conveniently reached and traced.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:
1. A cable conductor locator device comprising:
a test circuit adapted to be connected to a current source,
a portable stand,
an electric motor mounted on said stand,
a cam member drivable by said electric motor,
a pushbutton make and break switch in said test circuit to open and close said test circuit for supplying a pulsing current output therefrom in response to rotative movement of said cam member, said switch mounted on the portable stand,
an arm member interposed between the cam member and the pushbutton switch and pivotally mounted on the portable stand, a first end of the arm member contactable by said cam member at a second end of the arm member contactable by said switch, said arm member pivotally responsive to movement of said cam member to open and close said switch,
a socket member in said test circuit to receive a suitable light bulb, and
a test lead connected to said test circuit for applying said pulsing current to the conductor to be located.
2. A cable conductor locator device as described in claim 1, wherein:
said cam member includes an adjustable cam member having two adjustable cams on a single shaft in order to open and close said test circuit at desired intervals.

* * * * *